US011632896B2

(12) United States Patent
Zerbino

(10) Patent No.: US 11,632,896 B2
(45) Date of Patent: Apr. 25, 2023

(54) WORKING VEHICLE AND SUPPORT SYSTEM FOR THE SAME

(71) Applicant: KUBOTA CORPORATION, Osaka (JP)

(72) Inventor: Fulvio Zerbino, Argenteuil (FR)

(73) Assignee: KUBOTA CORPORATION, Osaka (JP)

( * ) Notice: Subject to any disclaimer, the term of this patent is extended or adjusted under 35 U.S.C. 154(b) by 158 days.

(21) Appl. No.: 16/892,673

(22) Filed: Jun. 4, 2020

(65) Prior Publication Data

US 2020/0404834 A1 Dec. 31, 2020

(30) Foreign Application Priority Data

Jun. 27, 2019 (EP) .................................... 19305868

(51) Int. Cl.
| | | |
|---|---|---|
| B60R 16/023 | (2006.01) | |
| A01B 59/06 | (2006.01) | |
| A01B 79/00 | (2006.01) | |
| B60K 35/00 | (2006.01) | |
| B62D 49/00 | (2006.01) | |
| A01B 63/10 | (2006.01) | |

(52) U.S. Cl.
CPC ............ *A01B 79/005* (2013.01); *B60K 35/00* (2013.01); *B60R 16/023* (2013.01); *B62D 49/00* (2013.01); *A01B 59/067* (2013.01); *A01B 63/1006* (2013.01); *B60K 2370/167* (2019.05)

(58) Field of Classification Search
None
See application file for complete search history.

(56) References Cited

U.S. PATENT DOCUMENTS

2001/0032031 A1* 10/2001 Ufheil .................. E02F 9/2025
700/169
2002/0029542 A1 3/2002 Davis et al.
(Continued)

FOREIGN PATENT DOCUMENTS

| EP | 2 319 291 A1 | 5/2011 |
|---|---|---|
| EP | 3 025 578 A1 | 6/2016 |

(Continued)

OTHER PUBLICATIONS

Extended European Search Report on European Patent Application No. 19305868.2 dated Jan. 9, 2020.
(Continued)

*Primary Examiner* — James J Lee
*Assistant Examiner* — David Hatch
(74) *Attorney, Agent, or Firm* — Greenblum & Bernstein, P.L.C.

(57) ABSTRACT

A working vehicle includes a vehicle body to be coupled to a working device, a communication controller to obtain first operation information relating to operation of the working device, the communication controller being electrically connected to the working device to communicate bi-directionally with the working device, an applicability judging device to judge applicability of the working device to the operation based on the first operation information obtained by the communication controller, and a display device to display the applicability judged by the applicability judging part.

12 Claims, 19 Drawing Sheets

(56) References Cited

U.S. PATENT DOCUMENTS

| | | | | |
|---|---|---|---|---|
| 2005/0102865 A1* | 5/2005 | Bell | ...................... | E02F 9/2025 |
| | | | | 37/195 |
| 2015/0379785 A1* | 12/2015 | Brown, Jr. | ............ | G06F 16/245 |
| | | | | 701/29.1 |
| 2018/0057017 A1* | 3/2018 | Procuniar | ............ | G05B 13/042 |
| 2020/0008340 A1* | 1/2020 | Stanhope | ............... | A01B 76/00 |

FOREIGN PATENT DOCUMENTS

| | | |
|---|---|---|
| JP | 2006-296261 | 11/2006 |
| JP | 2017-209032 | 11/2017 |
| JP | 2018 61470 A | 4/2018 |
| WO | 2014 137533 A2 | 9/2014 |

OTHER PUBLICATIONS

Office Action issued in Corresponding JP Patent Application No. 2020-096296, dated Dec. 6, 2022, along with an English translation thereof.

* cited by examiner

FIG.2A

| Function (Software function) | Switching | |
|---|---|---|
| Automatic shift-change | Valid | Invalid |
| 4WD | | |
| 4WD Double speed | | |
| 2WD | | |
| Manual elevation | | |
| Back up | | |
| Auto up | | |
| Holding | | |
| Leveling | | |
| Inclining | | |

FIG.2B

| Function (Hardware function) |
| --- |
| Backward PTO driving |
| Forward PTO driving |
| Backward elevation |
| Forward elevation |
| Auxiliary valve |

FIG.2C

| | | |
|---|---|---|
| Software function | Automatic shift-change | Installed |
| | 4WD | Installed |
| | 4WD Double speed | Installed |
| | 2WD | Installed |
| | Manual elevation | Installed |
| | Back up | Installed |
| | Auto up | Installed |
| | Holding | Installed |
| | Leveling | — |
| | Inclining | — |
| Hardware function | Backward PTO driving | Installed |
| | Forward PTO driving | Installed |
| | Backward elevation | — |
| | Forward elevation | — |
| | Aux. valve1 Set pressure20MPa | Installed |
| | Aux. valve2 Set pressure10MPa | Installed |
| | Aux. valve3 Set pressure10MPa | Installed |
| | Aux. valve4 Set pressure15MPa | Installed |
| | Aux. valve5 Set pressure16MPa | Installed |
| | Aux. valve6 Set pressure25MPa | Installed |

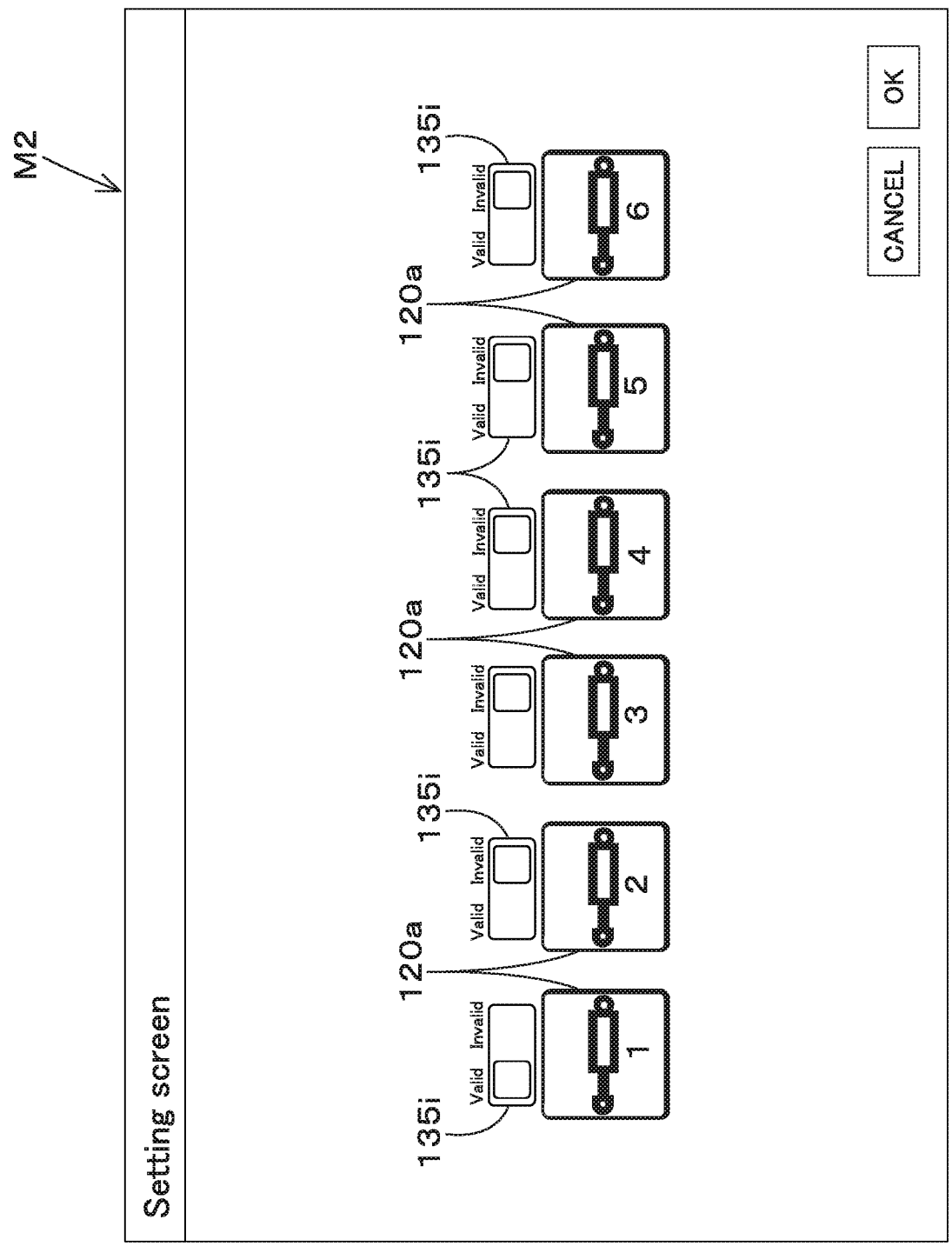

FIG.4

| Second operation information | |
|---|---|
| Automatic shift-change | Valid |
| 4WD | Invalid |
| 4WD Double speed | Invalid |
| 2WD | Valid |
| Manual elevation | Valid |
| Back up | Invalid |
| Auto up | Invalid |
| Holding | Valid |
| Leveling | — |
| Inclining | — |

FIG.6A

| Second operation information (Installed function) | First operation information | | Applicability |
|---|---|---|---|
| | Function information | | |
| Automatic shift-change | Installed | Compatible | Optimal |
| 4WD | Installed | — | — |
| 4WD Double speed | Installed | — | — |
| 2WD | Installed | Compatible | Optimal |
| Manual elevation | Installed | Compatible | Optimal |
| Back up | Installed | — | — |
| Auto up | Installed | — | — |
| Holding | — | Compatible | Optimal |
| Leveling | — | — | — |
| Inclining | Installed | — | — |
| Backward PTO driving | Installed | Compatible | Optimal |
| Forward PTO driving | Installed | — | — |
| Backward elevation | — | Compatible | Optimal |
| Forward elevation | — | — | — |
| Auxiliary valve | Installed | Compatible | Optimal |

FIG.6B

| Second operation information (Operation setting) | | First operation information | | Applicability |
|---|---|---|---|---|
| | | Request information | | |
| Automatic shift-change | Valid | Invalid | | Slightly inapplicable |
| 4WD | Invalid | — | | — |
| 4WD Double speed | Invalid | — | | — |
| 2WD | Valid | Valid | | Optimal |
| Manual elevation | Valid | Valid | | Optimal |
| Back up | Invalid | — | | — |
| Auto up | Invalid | — | | — |
| Holding | Valid | Valid | | Optimal |
| Leveling | — | — | | — |
| Inclining | — | — | | — |
| Aux. valve1 Set pressure 20MPa | Invalid(unconnected) | — | | — |
| Aux. valve2 Set pressure 10MPa | Valid(connected) | Pressure 15.0MPa | | Slightly inapplicable |
| Aux. valve3 Set pressure 10MPa | Invalid(unconnected) | — | | — |
| Aux. valve4 Set pressure 15MPa | Invalid(unconnected) | — | | — |
| Aux. valve5 Set pressure 16MPa | Invalid(unconnected) | — | | — |
| Aux. valve6 Set pressure 25MPa | Invalid(unconnected) | — | | — |

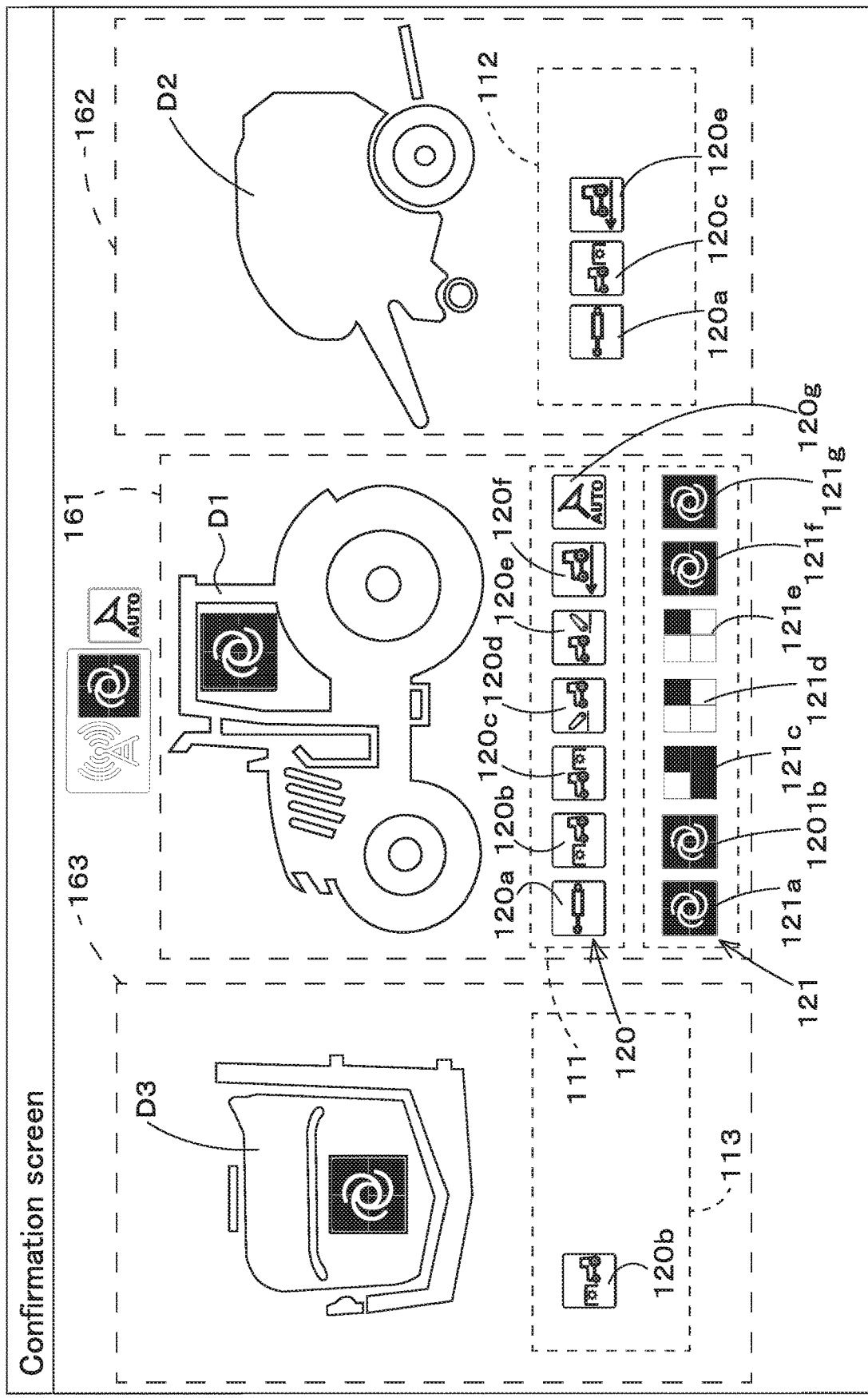

FIG.8

| Second operation information (Operation setting of setting tool) | | First operation information | Applicability |
|---|---|---|---|
| | | Request information | |
| Automatic shift-change | Invalid | Valid | Applicable |
| Upper-limit setting | 85% | 75% | Optimal |
| Rev. speed of prime mover | 1400rpm | 1800rpm | Applicable |

FIG.10

| Second operation information | | | First operation information |
|---|---|---|---|
| | Program A | Program B | Function information |
| Automatic shift-change | Installed | Installed | Compatible |
| 4WD | Installed | Installed | — |
| 4WD Double speed | Installed | Installed | — |
| 2WD | Installed | Installed | Compatible |
| Manual elevation | Installed | Installed | Compatible |
| Back up | — | Installed | Compatible |
| Auto up | — | Installed | Compatible |
| Holding | Installed | Installed | Compatible |
| Leveling | — | — | — |
| Inclining | — | — | — |

WORKING VEHICLE AND SUPPORT SYSTEM FOR THE SAME

CROSS-REFERENCE TO RELATED APPLICATIONS

The present application claims priority under 35 U.S.C. § 119 to European Patent Application No. 19305868.2, filed Jun. 27, 2019. The content of this application is incorporated herein by reference in their entirety.

BACKGROUND OF THE INVENTION

Field of the Invention

The present invention relates to a working vehicle such as a tractor.

Description of Related Art

Japanese Unexamined Patent Publication No. 2018-61470 is previously known as a system for managing a working device to be coupled to a working vehicle such as a tractor.

A management system for a working device management system disclosed in Japanese Unexamined Patent Publication No. 2018-61470 includes a wireless tag that is attached to a working device and has a communication device to transmit at least identification information, a code display device that graphically shows the identification information of the wireless tag, a reading device to read the figure of the code display device, and a registration device that restores the figure read by the reading device to the identification information and registers the working device in association with the restored identification information.

SUMMARY OF THE INVENTION

A working vehicle includes: a vehicle body to be coupled to a working device; a communication controller to obtain first operation information relating to operation of the working device, the communication controller being electrically connected to the working device to communicate bi-directionally with the working device; an applicability judging device to judge applicability of the working device to the operation on the basis of the first operation information obtained by the communication controller; and a display device to display the applicability judged by the applicability judging part.

A support system for a working vehicle, includes: a server to obtain, from the working vehicle according to any one of claims 1 to 8, the applicability and vehicle information relating to the working vehicle; and an external device to obtain the applicability and the vehicle information from the server and to display the applicability and the vehicle information obtained above.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a view illustrating an example of a software function to be constituted of software;

FIG. 2B is a view illustrating an example of a hardware;

FIG. 2C is a view illustrating an example of second operation information;

FIG. 3B is a view illustrating an example of a setting screen M2;

FIG. 4 is a view illustrating an example of the second operation information (operation setting);

FIG. 6A is a view illustrating relation between the second operation information (a installed function) and first operation information (function information);

FIG. 6B is a view illustrating relation between the second operation information (operation setting) and the first operation information (request information);

FIG. 7A is a view illustrating an example of a confirmation screen M3;

FIG. 8 is a view illustrating relation between the applicability and values of the operation setting performed by a setting tool;

FIG. 10 is a view illustrating relation between software programs (programs) and functions.

DESCRIPTION OF THE EMBODIMENTS

Figure 1A:
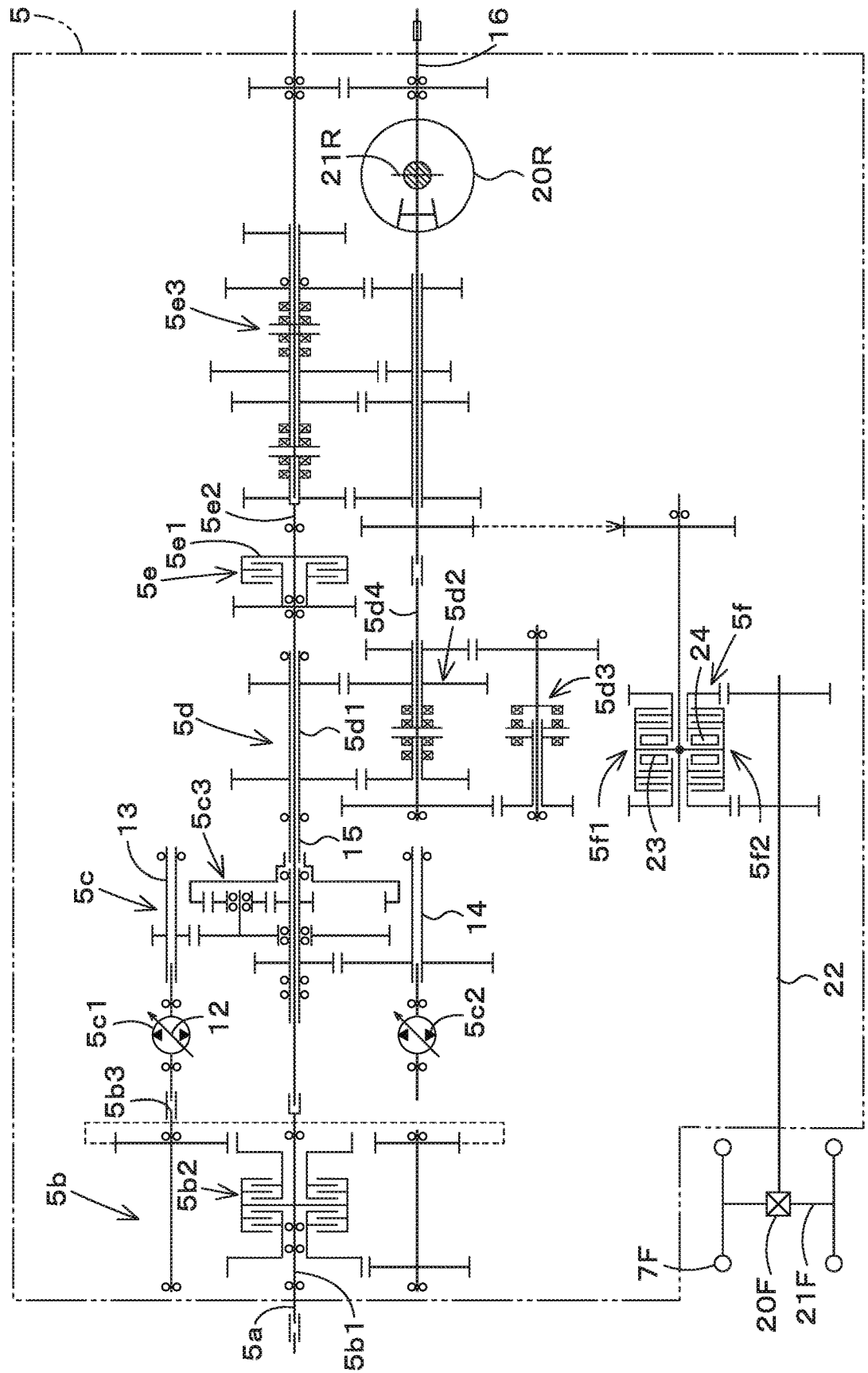
FIG. 1A is a configuration view of a transmission.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

First Embodiment

Figure 11:
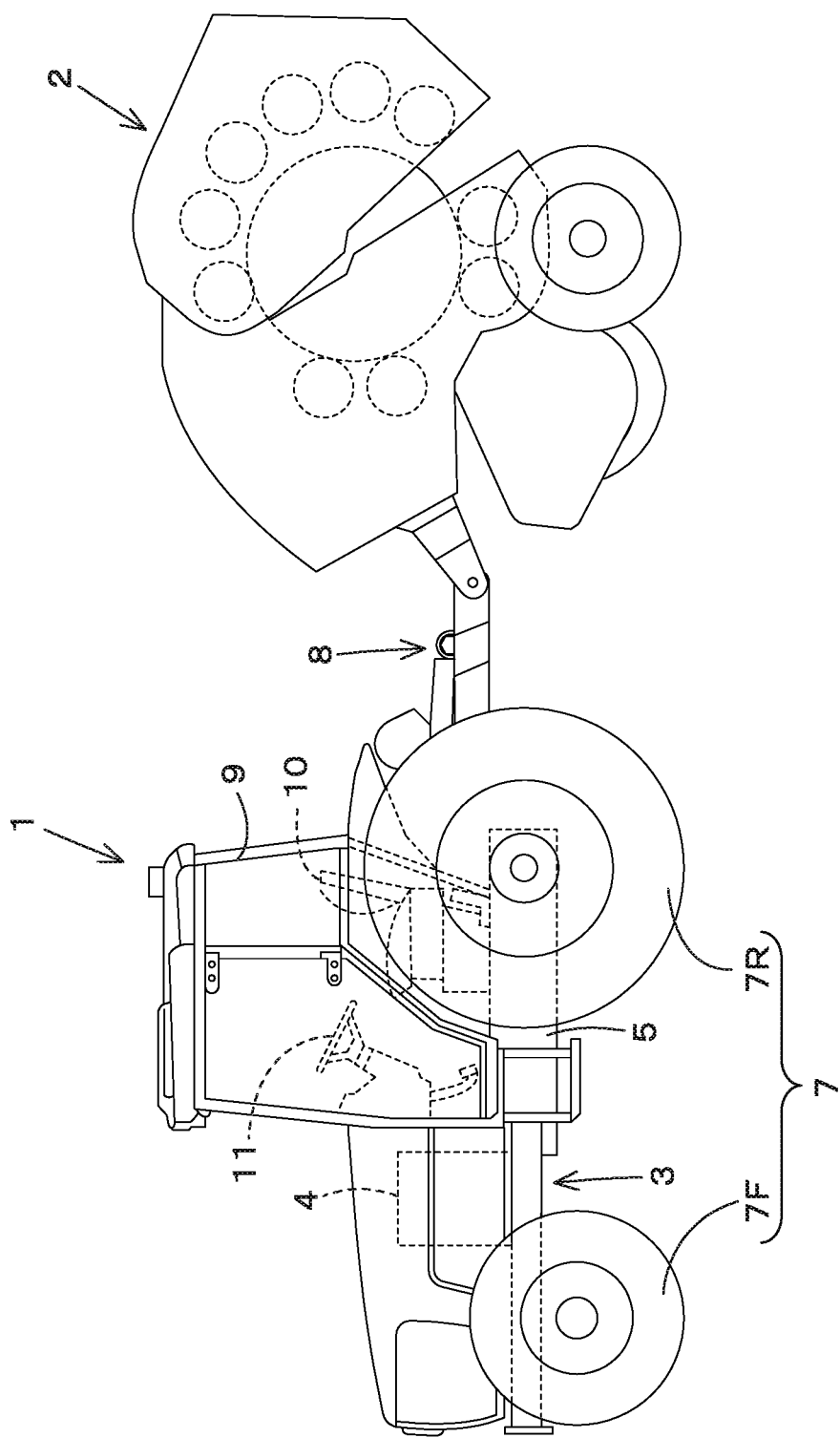
FIG. 11 is a whole view of a tractor.

FIG. 11 shows a tractor 1 that is an example of a working machine. The tractor 1 will be described as an example; however, the working machine is not limited to the tractor and may be an agricultural machine such as a rice transplanter.

As shown in FIG. 11, the tractor 1 includes a traveling body (vehicle body) 3 having a traveling device 7, a prime mover 4, a transmission 5, and a steering device 11. The traveling device 7 is a device having a front wheel 7F and a rear wheel 7R. The front wheel 7F may be a tire type or a crawler type. In addition, the rear wheel 7R may also be a tire type or a crawler type. The prime mover 4 is an internal combustion engine such as a gasoline engine or a diesel engine, an electric motor, or the like. In this embodiment, the prime mover 4 is the diesel engine.

The transmission 5 can switch the thrust force of the traveling device 7 through the shift changing, and also can switch the traveling device 7 between the forward traveling and the backward traveling. A cabin 9 is provided in the vehicle body 3, and an operator seat 10 is provided in the cabin 9.

A coupling portion 8 is provided at the rear portion of the vehicle body 3. The working device 2 is configured to be attached to and detached from the coupling portion 8. In this embodiment, the coupling portion 8 is the elevation device that lifts and lowers the working device 2 attached. The working device 2 includes a tilling device for plowing, a fertilizer spraying device for spraying fertilizer, an agricultural chemicals spraying device for spraying agricultural chemicals, a harvesting device for harvesting, a reaping device for reaping grass or the like, a tedding device for tedding the grass or the like, a raking device for raking the grass or the like, and a baler for baling the grass or the like. In addition, FIG. 11 shows an example of attachment of the baler as the working device 2.

As shown in FIG. 1A, the transmission 5 includes a main shaft (thrust shaft) 5a, a shuttle portion 5b, a main shift-changing portion 5c, a sub shift-changing portion 5d, a PTO power transmission portion 5e, a front shift-changing portion 5f. The thrust shaft 5a is rotatably supported by a housing case of the transmission 5, and thus the power from the crankshaft of the prime mover 4 is transmitted to the thrust shaft 5a.

The shuttle portion 5b has a shuttle shaft 5b1 and a forward/reverse switching portion 5b2. The power from the thrust shaft 5a is transmitted to the shuttle shaft 5b1. The forward/reverse switching portion 5b2 is constituted of, for example, a hydraulic clutch or the like, and switches the rotation direction of the shuttle shaft 5b1, that is, switches the forward traveling and the reverse traveling of the tractor 1 by engaging and disengaging the hydraulic clutch.

The main shift-changing portion 5c is a continuously variable transmission mechanism that continuously changes the input power. The continuously variable transmission mechanism includes a hydraulic pump 5c1, a hydraulic motor 5c2, and a planetary gear mechanism 5c3. The hydraulic pump 5c1 is rotated by the power from the output shaft 5b3 of the shuttle portion 5b. The hydraulic pump 5c1 is, for example, a variable displacement pump having a swash plate 12, and is configured to change the angle (swash plate angle) of the swash plate 12 to change the flow rate of hydraulic fluid discharged from the hydraulic pump 5c1. The hydraulic motor 5c2 is a motor that is rotated by hydraulic fluid discharged from the hydraulic pump 5c1 through a hydraulic circuit such as piping. The rotation speed of the hydraulic motor 5c2 can be changed when the swash plate angle of the hydraulic pump 5c1 is changed or the power inputted to the hydraulic pump 5c1 is changed.

The planetary gear mechanism 5c3 is a mechanism constituted of a plurality of gears (gears) and a power transmission shaft such as an input shaft and an output shaft. The planetary gear mechanism 5c3 includes an input shaft 13 to which the power of the hydraulic pump 5c1 is inputted, an input shaft 14 to which the power of hydraulic motor 5c2 is inputted, and an output shaft 15 to output the power. The planetary gear mechanism 5c3 transmits, to the output shaft 15, the combined power combining the power of the hydraulic pump 5c1 and the power of the hydraulic motor 5c2.

Thus, according to the main shift-changing portion 5c, the power to be outputted to the sub shift-changing portion 5d can be changed by changing the swash plate angle of the swash plate 12 of the hydraulic pump 5c1, the rotation speed of the prime mover 4, and the like. The main shift-changing portion 5c is constituted of a continuously variable transmission mechanism, but may be a stepped transmission mechanism that performs the shifting through the gears.

The sub shift-changing portion 5d is a transmission mechanism having a plurality of stepped gears (gears) for shifting the power, and by appropriately changing the connection (engagement) of the plurality of gears, the power inputted from the output shaft 15 of the planetary gear mechanism 5c3 to the sub shift-changing portion 5d is changed and outputted (shifted). The sub shift-changing portion 5d includes an input shaft 5d1, a first transmission clutch 5d2, a second transmission clutch 5d3, and an output shaft 5d4. The input shaft 5d1 is a shaft to which the power of the output shaft 15 of the planetary gear mechanism 5c3 is inputted, and inputs the inputted power to the first transmission clutch 5d2 and the second transmission clutch 5d3 through the gears or the like. By switching the engaging and disengaging of each of the first transmission clutch 5d2 and the second transmission clutch 5d3, the inputted power is changed and then is outputted to the output shaft 5d4. The power outputted to the output shaft 5d4 is transmitted to the rear wheel differential device 20R. The rear wheel differential device 20R rotatably supports a rear axle 21R to which the rear wheel 7R is attached.

The PTO power transmission portion 5e includes a PTO clutch 5e1, a PTO thrust shaft 5e2, and a PTO shift-changing portion 5e3. The PTO clutch 5e1 is constituted of, for example, a hydraulic clutch or the like, and is switched between the state in which the power of the thrust shaft 5a is transmitted to the PTO thrust shaft 5e2 (a connected state) and the state where the power of the thrust shaft 5a is not transmitted to the PTO thrust shaft 5e2 (a disconnected state) by engaging and disengaging the hydraulic clutch. The PTO shift-changing portion 5e3 includes a transmission clutch, a plurality of gears, and the like, and changes and outputs the power (the rotation speed) inputted from the PTO thrust shaft 5e2 to the PTO shift-changing portion 5e3.

The power of the PTO shift-changing portion 5e3 is transmitted to the PTO shaft 16 through the gears or the like.

The front shift-changing portion 5f includes a first front transmission clutch 5f1 and a second front transmission clutch 5f2. The first front transmission clutch 5f1 and the second front transmission clutch 5f2 can transmit the power transmitted from the sub shift-changing portion 5d. For example, the power of the output shaft 5d4 is transmitted through the gears and the transmission shaft. The power from the first front transmission clutch 5f1 and the second front transmission clutch 5f2 can be transmitted to the front axle 21F via the front transmission shaft 22. In particular, the front transmission shaft 22 is connected to the front wheel differential device 20F, and the front wheel differential device 20F rotatably supports the front axle 21F to which the front wheel 7F is attached.

The first front transmission clutch 5f1 and the second front transmission clutch 5f2 are constituted of hydraulic clutches or the like. A fluid tube is connected to the first front transmission clutch 5f1, and the fluid tube is connected to a control valve 23 to which the hydraulic fluid discharged from the hydraulic pump is supplied. The first front shift clutch 5f1 is switched between a connected state and a disconnected state depending on the opening degree of the control valve 23. A fluid tube is connected to the second front shift clutch 5f2, and the fluid tube is connected to a control valve 24. The second front transmission clutch 5f2 is switched between a connected state and a disconnected state depending on the opening degree of the control valve 24. Each of the control valve 23 and the control valve 24 is, for example, a two-position switching valve with solenoid valve, and is switched to the connected state or the disconnected state by magnetizing or demagnetizing a solenoid of the solenoid valve.

When the first front transmission clutch 5/1 is in the disconnected state and the second front transmission clutch 5/2 is in the connected state, the power of the sub shift-changing portion 5d is transmitted to the front wheels 7F through the second front transmission clutch 5/2. Accordingly, the front wheels and the rear wheels are driven in the four-wheel driving (4WD) by the power, and the rotation speeds of the front wheels and the rear wheels are substantially the same (4WD constant speed state). On the other hand, when the first front transmission clutch 5/1 is in the connected state and the second front transmission clutch 5/2 is in the disconnected state, the four-wheel driving is established and the rotation speeds of the front wheels are faster than the rotation speeds of the rear wheels (4WD doubled speed State). In addition, when the first front transmission clutch 5/1 and the second front transmission clutch 5/2 are in the connected state, the power of the sub shift-changing portion 5d is not transmitted to the front wheels 7F, so that the two-wheel driving (2WD) is established in which the rear wheels are driven by the power.

Figure 1B:
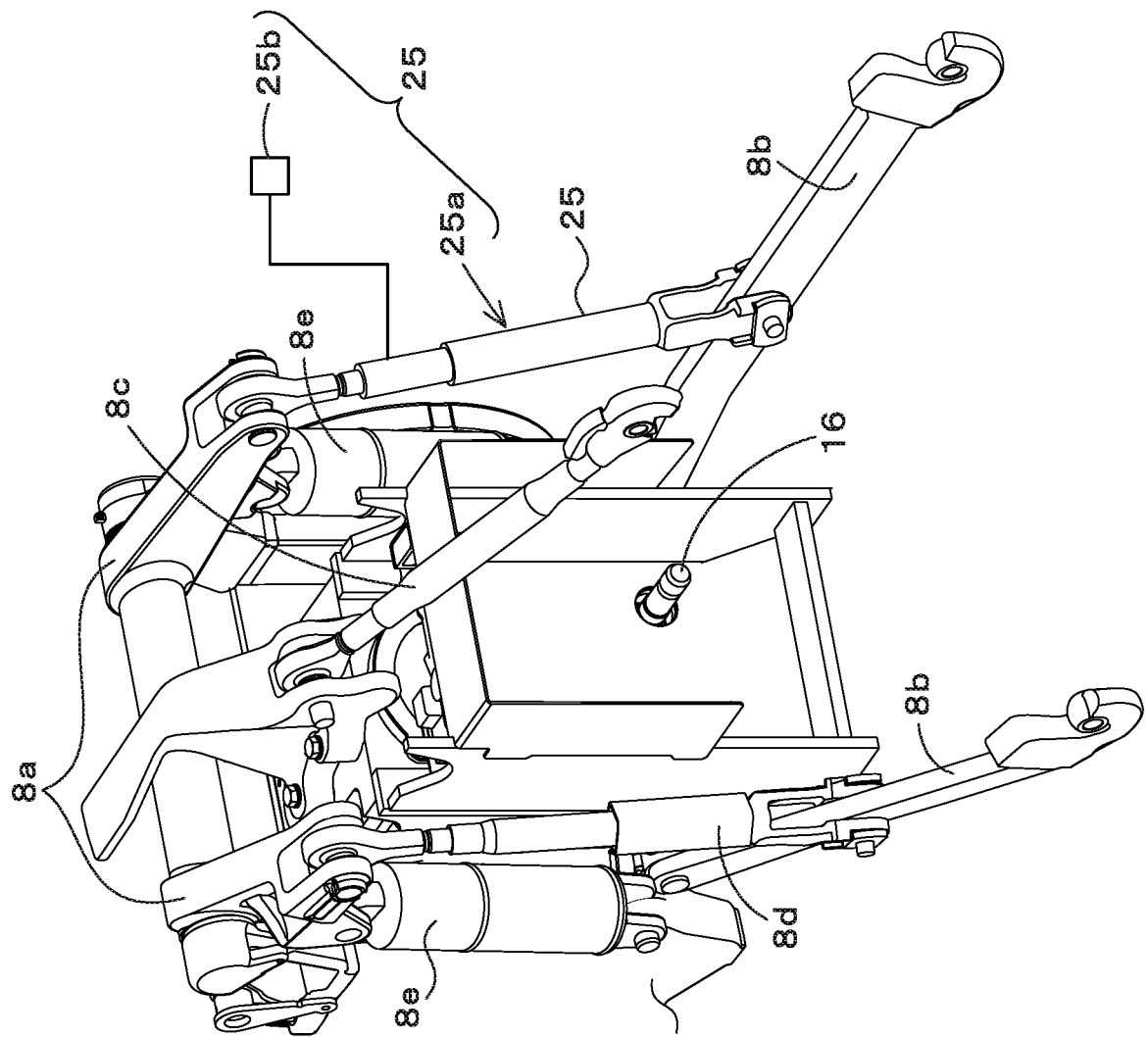
FIG. 1B is a perspective view of an elevation device.

As shown in FIG. 1B, the elevation device (the coupling portion) 8 includes a lift arm 8a, a lower link 8b, a top link 8c, a lift rod 8d, and a lift cylinder 8e. The front end portion of the lift arm 8a is supported by a rear upper portion of a case (a transmission case) housing the transmission 5 so as to be swingable upward or downward. The lift arm 8a is swung (lifted) by the driving of the lift cylinder 8e. The lift cylinder 8e is constituted of a hydraulic cylinder. The lift cylinder 8e is connected to the hydraulic pump through the control valve 34. The control valve 34 is an electromagnetic valve or the like, and stretches and shortens the lift cylinder 8e.

The front end portion of the lower link 8b is supported by the lower rear portion of the transmission 5 so as to be swingable upward or downward. The front end portion of the top link 8c is supported on the rear portion of the transmission 5 so as to be swingable upward or downward, above the lower link 8b. The lift rod 8d couples the lift arm 8a and the lower link 8b. The working device 2 is connected to the rear portion of the lower link 8b and the rear portion of the top link 8c. When the lift cylinder 8e is driven (stretched/shortened), the lift arm 8a moves upward and downward, and the lower link 8b connected to the lift arm 8a through the lift rod 8d moves upward and downward. In this manner, the working device 2 is swung upward and downward (lifted and lowered) about the front portion of the lower link 8b as a fulcrum.

The elevation device 8 is provided with a posture changing device 25. The posture changing device 25 is a device configured to change the posture of the working device 2 attached to the vehicle body 3. The posture changing device 25 has a control valve 25b and a change cylinder 25a constituted of a hydraulic cylinder. The change cylinder 25a is connected to the hydraulic pump through a control valve 25b. The control valve 25b is an electromagnetic valve or the like, and stretches and shortens the change cylinder 25a. The change cylinder 25a couples the lift arm 8a and the lower link 8b.

Figure 1C:
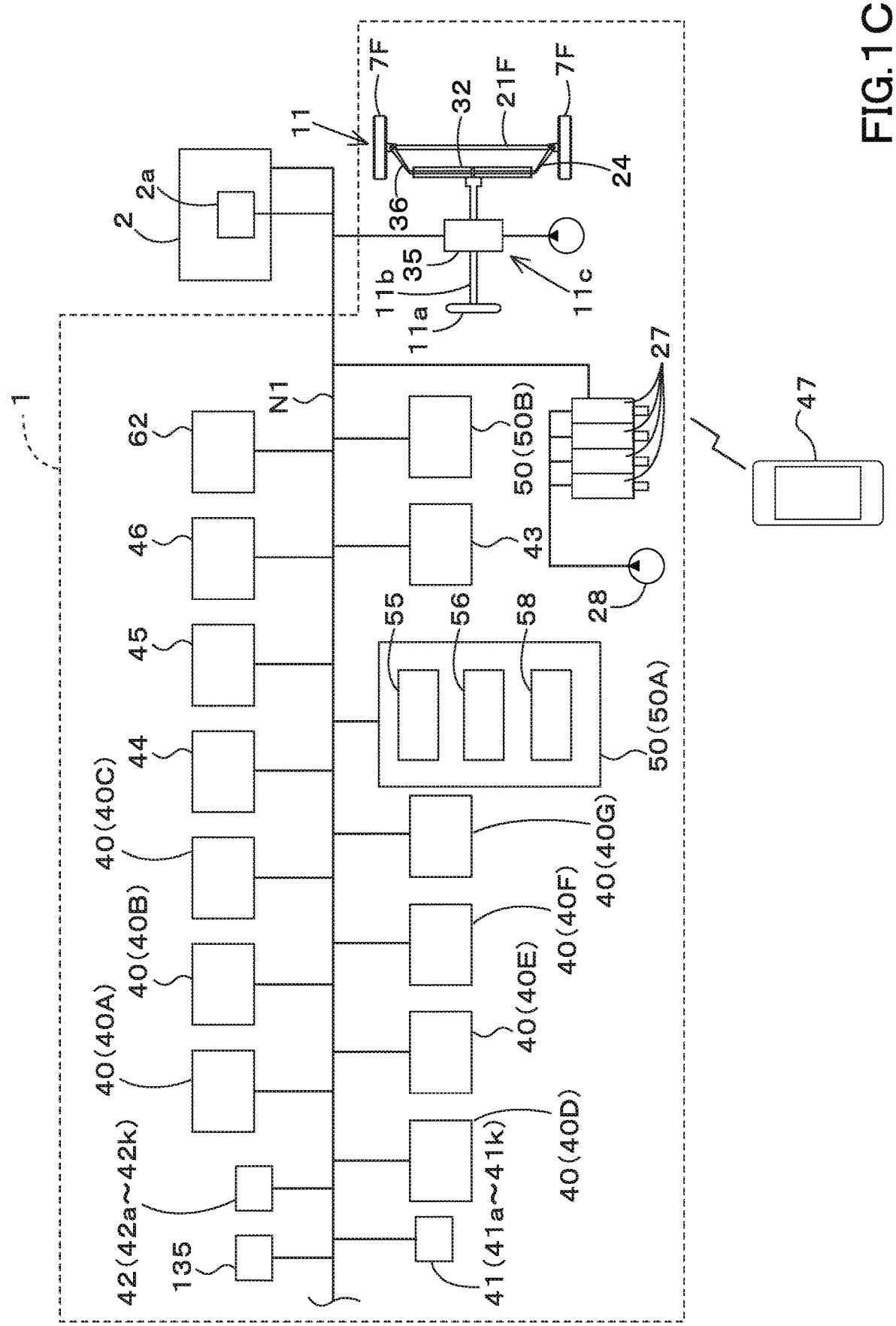
FIG. 1C is a view illustrating a control block diagram of a working machine.

As shown in FIG. 1C, the tractor 1 has a plurality of auxiliary valves 27. The plurality of auxiliary valves 27 are hydraulic switching valves to which the hydraulic fluid is supplied from the hydraulic pump 28. Each of the plurality of auxiliary valves 27 has an output port, and a hydraulic hose or the like can be connected to the output port. When the hydraulic hose connected to arbitrary one of the output ports of the auxiliary valves 27 is connected to the hydraulic attachment of the working device 2, various hydraulic attachments attached to the working device 2 can be operated.

The steering device 11 includes a handle (a steering wheel) 11a, a rotating shaft (a steering shaft) 11b that rotates in accordance with the rotation of the handle 11a, and an assist mechanism (a power steering mechanism) 11c that assists the steering of the handle 11a. The auxiliary mechanism 11c includes a control valve 35 and a steering cylinder 32. The control valve 35 is, for example, a three-position switching valve that can be switched by the movement of a spool or the like. In addition, the control valve 35 also can be switched by the steering of the steering shaft 11b. The steering cylinder 32 is connected to an arm (a knuckle arm) 36 that changes the orientation of the front wheel 7F. Thus, when the handle 11a is operated, the switching position and opening degree of the control valve 35 are switched according to the handle 11a, and the steering cylinder 32 is stretched or shortened to the left or right in accordance with the switching position and opening degree of the control valve 35, thereby changing the steering direction of the front wheel 7F. In addition, the steering device 11 mentioned above is an example, and is not limited to the configuration mentioned above.

The tractor 1 includes a plurality of detection devices 41. The plurality of detection devices 41 are devices configured to detect the state of the tractor 1, and are, for example, a water temperature sensor 41a that detects the water temperature, a fuel sensor 41b that detects the remaining amount of fuel, a prime mover rotation sensor (a rotation sensor) 41c that detects the rotation speed of the prime mover 4, an accelerator pedal sensor 41d that detects the operation amount of the accelerator pedal, a steering angle sensor 41e that detects the steering angle of the steering device 11, an angle sensor 41f that detects the angle of the lift arm 8a, an inclination detection sensor 41g that detects an inclination of the vehicle body 3 in a width direction (in the right direction or the left direction), a speed sensor 41h that detects the vehicle speed (a velocity) of the vehicle body 3, a PTO rotation sensor (a rotation sensor) 41i that detects the rotation speed of the PTO shaft, a battery sensor 41j that detects the voltage of the storage battery such as a battery, a positioning sensor (a measurement device) 41k that detects the position of the vehicle body 3 on the basis of the signals from a positioning satellite, or the like. The speed sensor 41h converts, for example, the rotation speed of the front axle 21F, the rotation speed of the rear axle 21R, the rotation speed of the front wheel 7F, the rotation speed of the rear wheel 7R, or the like into the vehicle speed, and thus detects the vehicle speed. In addition, the speed sensor 41h can also detect the rotational direction of any one of the front axle 21F, the rear axle 21R, the front wheel 7F, and the rear wheel 7R, and thus can detect whether the tractor 1 (the vehicle body 3) is moving forward or backward. The detection device 41 described above is an example, and is not limited to the sensor described above.

In addition, the tractor 1 includes a plurality of operation members (operation devices) 42. The plurality of operation members 42 include a shuttle lever 42a for switching the forward traveling and the reverse traveling of the vehicle body 3, an ignition switch 42b for starting the prime mover 4 or the like, a PTO speed-changing lever 42c for setting the rotation speed of the PTO shaft, a shift changeover switch 42d for switching between the automatic shifting and the manual shifting, a shift lever 42e for manually switching the shift position (the shift level) of the transmission 5, an accelerator 42f for increasing and decreasing the vehicle speed, a switch 42g for operating elevation of the elevation device 8, a height setting dial 42h for setting the upper limit of the elevation device 8, a vehicle speed lever 42i for setting the vehicle speed, a hydraulic operation tool 42j, a rotation setting tool 42k for setting the upper limit of the prime mover rotation speed, and the like.

The setting tools such as the shift changeover switch 42d, the height setting dial 42h, and the rotation setting tool 42k are provided in a console box arranged on the side of the operator seat 10. The operation of the vehicle body 3 can be set by the driver operating the setting tools (the shift changeover switch 42d, the height setting dial 42h, and the rotation setting tool 42k). The operation member 42 described above is an example, and is not limited to the above-described configuration.

Now, as shown in FIG. 2A, the tractor 1 (the vehicle body 3) is provided with a plurality of functions (software functions that can be set by software), and the tractor 1 (the vehicle body 3) performs a predetermined operation in accordance with each of the functions. The automatic shifting function is a function that automatically changes the speed, the 4WD is a function that rotates the front wheels and rear wheels simultaneously at a constant speed, the 4WD double speed is a function that increases the rotation speeds of the front wheels more than the rotation speeds of the rear wheels, and the 2WD is a function that drives the rear wheels.

The manual elevating function is a function for lifting and lowering the working device 2 in manual operation, the backup function is a function for automatically lifting the working device 2 when the vehicle body 3 is moved backward, the auto-up function is a function that lifts the working device 2 in the case where a steering angle of the vehicle body 3 reaches a predetermined angle or more, and the auto steer function is a function that automatically steers the vehicle body 3.

The holding function is a function that holds the angle of the working device 2 in the width direction to a predetermined angle, the leveling function is a function that horizontally holds the working device 2, and the tilt function is a function that keeps the working device 2 horizontally with respect to an agricultural field (the ground).

The software functions prepared for the tractor 1 (the vehicle body 3) can be switched between valid and invalid. Information about whether the software functions prepared for the tractor 1 (the vehicle body 3) is valid or invalid is stored as second operation information of the operation of the tractor 1 in a memory portion 45 (see FIG. 1C) described later.

In addition, as shown in FIG. 2B, the tractor 1 (the vehicle body 3) has a function (a hardware function) determined by the structure of the tractor 1. The rear PTO driving indicates that the PTO shaft protrudes from the rear portion of the vehicle body 3 and can transmit the power from the PTO shaft on the rear portion to the working device 2. The front PTO driving indicates that the PTO shaft protrudes from the front portion of the vehicle body 3 and can transmit the power from the PTO shaft on the front portion to the working device 2. The rear elevating indicates that the elevation device 8 is provided at the rear portion of the vehicle body 3 and can lifting and lowering the working device 2 at the rear portion of the vehicle body 3. The front elevating indicates that the elevation device 8 is provided at the front portion of the vehicle body 3 and can lifting and lowering the working device 2 at the front portion of the vehicle body 3. The auxiliary valve 27 indicates that a valve configured to be switched by the hydraulic fluid supplied from the hydraulic pump 28 or the like is mounted. The tractor 1 is provided with a plurality of auxiliary valves 27, and each of the plurality of auxiliary valves 27 has a set pressure (a pilot pressure) for outputting the hydraulic fluid.

As shown in FIG. 2C, the information on whether or not the above-described software function and hardware function are provided in the tractor 1 is stored as the second operation information in the memory portion 45.

Next, a control for executing the plurality of functions (the software functions) provided in the tractor 1 (the vehicle body 3) will be described.

As illustrated in FIG. 1C, the tractor 1 includes a control device 40 and the memory portion 45. The control device 40 is a device configured to perform various controls of the tractor 1, and includes a CPU, an electric-electronic circuit, a program stored in the control device 40, and the like. The memory portion 45 is constituted of a nonvolatile memory or the like, and stores various types of the information.

The control device 40 includes a shift-changing control portion 40A, an engine control portion 40B, a PTO control portion 40C, an elevation control portion 40D, an automatic steering control portion 40E, a posture control portion 40F, and an auxiliary hydraulic control portion 40G.

It is not required for the control device 40 to include all of the shift-changing control portion 40A, the engine control portion 40B, the PTO control portion 40C, the elevation control portion 40D, the automatic steering control portion 40E, the posture control portion 40F, and the auxiliary hydraulic control portion 40G. The control portions are provided in the tractor 1 in accordance with the specifications of the tractor 1. In addition, the shift-changing control portion 40A, the engine control portion 40B, the PTO control portion 40C, the elevation control portion 40D, the automatic steering control portion 40E, the posture control portion 40F, and the auxiliary hydraulic control portion 40G may be integrally provided in the control device 40.

The shift-changing control portion 40A performs the shift control. In the shift control, either one of the main shift-changing portion 5c and the sub shift-changing portion 5d is automatically switched according to the state of the tractor 1 when the automatic shift function is valid, and then the shift position (the shift level) of the transmission 5 is automatically changed to a shift position (the shift level) determined in advance. In the shift control, either one of the main shift-changing portion 5c and the sub shift-changing portion 5d is automatically switched according to the shift position (the shift level) set by the shift lever 42e when the shift changeover switch 42d is switched to the manual shifting, and then the shift position of the transmission 5 is changed.

The shift-changing control portion 40A performs control (a traveling-switching control) in the traveling-driving state of the traveling device 7 (operation of the traveling device 7). In the traveling-switching control, when the shuttle lever 42a is operated to the forward traveling, the vehicle body 3 travels forward by switching the forward/reverse switching portion 5b2 of the shuttle portion 5b to the forward traveling. In addition, in a progressing-switching control, when the shuttle lever 42a is operated to the backward traveling, the vehicle body 3 travels backward by switching the forward/reverse switching portion 5b2 of the shuttle portion 5b to the backward traveling.

In the traveling-switching control, the first front transmission clutch 5f1 is disengaged and the second front transmission clutch 5f2 is engaged in the 4WD. In the traveling-switching control, the first front transmission clutch 5f1 is engaged and the second front transmission clutch 5f2 is disengaged in the 4WD double speed. In the traveling-switching control, the first front transmission clutch 5f1 and the second front transmission clutch 5f2 are brought into the engaged state in the 2WD.

The engine control portion 40B performs the engine control. In the engine control, when the ignition switch 42b is turned on, the prime mover 4 is started through a predetermined process, and when the ignition switch 42b is turned off, the driving of the prime mover 4 is stopped. In the engine control, when the accelerator 42f is operated, the vehicle speed (speed) of the vehicle body 3 is changed by changing the rotation speed of the prime mover 4 (referred to as the prime mover rotation speed) according to the operation amount of the accelerator 42f.

The PTO control portion 40C performs the PTO control. In the PTO control, when the PTO shift lever 42c is operated, the rotation speed of the PTO shaft (referred to as the PTO rotation speed) is changed by switching the PTO transmission gear built in the transmission 5.

The elevation control portion 40D performs the elevation control. In the elevation control, when the manual elevating function is valid, the lift cylinder 8e is stretched by controlling the control valve 34, and the rear end portion of the lift arm 8a (the end portion on the working device 2 side) is lifted when the switch 42g is operated in a direction of the lifting (the lifting side). In the elevation control, when the manual elevating function is valid, the lift cylinder 8e is shortened by controlling the control valve 34, and the rear end portion of the lift arm 8a (the end portion on the working device 2 side) is lowered when the switch 42g is operated in a direction of the lowering (the lowering side). In the case where the working device 2 is lifted by the elevation device 8, the lifting operation of the elevating device 8 is stopped when the position of the working device 2, that is, the angle of the lift arm 8a reaches the upper limit (a height upper limit value) set by the height setting dial 42h.

In the lift control, when the backup function is valid, the lift cylinder 8e is stretched by automatically controlling the control valve 34 when the vehicle body 3 moves backward, and the rear end portion of the lift arm 8a (the end portion on the working device 2 side) is lifted. In the lifting control, when the auto-up function is valid, when the steering angle of the steering device 11 is equal to or more than a predetermined value, the lift cylinder 8e is stretched by automatically controlling the control valve 34, and thus the rear end portion of the lift arm 8a (the end portion on the working device 2 side) is lifted.

The automatic steering control portion 40E performs the automatic steering control. In the automatic steering control, when the auto steer function (the automatic steering function) is valid, the control valve 35 is controlled so that the position (the vehicle body position) detected by the positioning sensor 41k is matched with a scheduled traveling line preliminarily determined, and thereby the steering angle of the steering device 11 is automatically controlled.

The posture control portion 40F performs the posture control. In the posture control, in the case of the position function (the holding function), the length of the change cylinder 25a is held at a predetermined length by outputting a control signal to the control valve 25b. That is, the angle of the working device 2 in the width direction, the angle being set by the posture changing device 25, (the angle of the straight line connecting the lower links 8b and 8b with respect to the horizontal) is held. In the posture control, in the case of the leveling function, the change cylinder 25a is stretched and shortened by outputting a control signal to the control valve 25b, and the working device 2 set by the posture change device 25 is horizontally held. In the posture control, in the case of the tilting function, the change cylinder 25a is stretched and shortened by outputting a control signal to the control valve 25b, and the working device 2 set by the posture change device 25 is held parallel to the agricultural field (the ground).

The auxiliary hydraulic control portion 40G controls the auxiliary valve (the operation control valve) 27 to which a hydraulic hose or the like is connected among the plurality of auxiliary valves 27. For example, the auxiliary hydraulic control portion 40G performs control to switch the flow of the hydraulic fluid outputted from the predetermined auxiliary valve 27 when the hydraulic operation tool 42j such as a swingable lever is operated. For example, when the hydraulic operation tool 42j is operated to the left, the auxiliary hydraulic control portion 40G magnetizes the solenoid of the predetermined auxiliary valve 27, and moves the spool of the predetermined auxiliary valve 27 to supply the hydraulic fluid in one direction. In addition, when the hydraulic operation tool 42j is operated to the right, the auxiliary hydraulic control portion 40G magnetizes the solenoid of the predetermined auxiliary valve 27, and moves the spool of the predetermined auxiliary valve 27 to supply the hydraulic fluid in the other direction. In this manner, the hydraulic attachment of the working device 2 can be operated by the auxiliary valve 27.

The tractor 1 includes a plurality of display devices 50. The plurality of display devices 50 are devices configured to display various information relating to the tractor 1.

The plurality of display devices 50 are installed around the operator seat 10. The plurality of display devices 50 include a meter display device 50A and a terminal display device 50B. The meter display device 50A is a display device arranged in front of the operator seat 10 and in front of the handle 11a, and displays at least information (driving information) relating to the driving. The terminal display device 50B is a display device other than the meter display device 50A, and is arranged, for example, in front of or on the side of the operator seat 10. The terminal display device 50B displays at least information relating to the setting of the tractor 1. For convenience of the explanation, the meter display device 50A may be referred to as "display device 50A", and the terminal display device 50B may be referred to as "display device 50B". The tractor 1 is not required to include all of the display devices 50A and 50B, and the number of display devices can be arbitrarily changed.

The display device 50B can be operated by a finger touch operation or an operation tool operation by an operation tool. The operation tool is, for example, a rotary selector switch that can be pressed.

The display device 50B includes a display portion 55 that displays information and a display control portion 56 that controls the displaying. The display portion 55 is constituted of a liquid crystal panel, an organic EL panel, or the like. The display control portion 56 is constituted of a CPU, electrical/electronic components, or the like. The display control portion 56 is a device configured to perform various processes in the display device 50B. For example, the display control portion 56 displays various information on the display portion 55 by controlling the display portion 55 such as the panel. In the following explanation, the display of the display portion 55 is controlled by the display control portion 56.

The display device 50B includes a setting receiver portion 58. The setting receiver portion 58 is constituted of a CPU, an electric/electronic circuit, a program stored in the control device 40, or the like. The setting receiver portion 58 can receive a setting (an operation setting) related to the operation of the vehicle body 3. The setting receiver portion 58 receives, for example, the setting of validation or invalidation to a plurality of software functions that are one of operation settings.

Figure 3A:
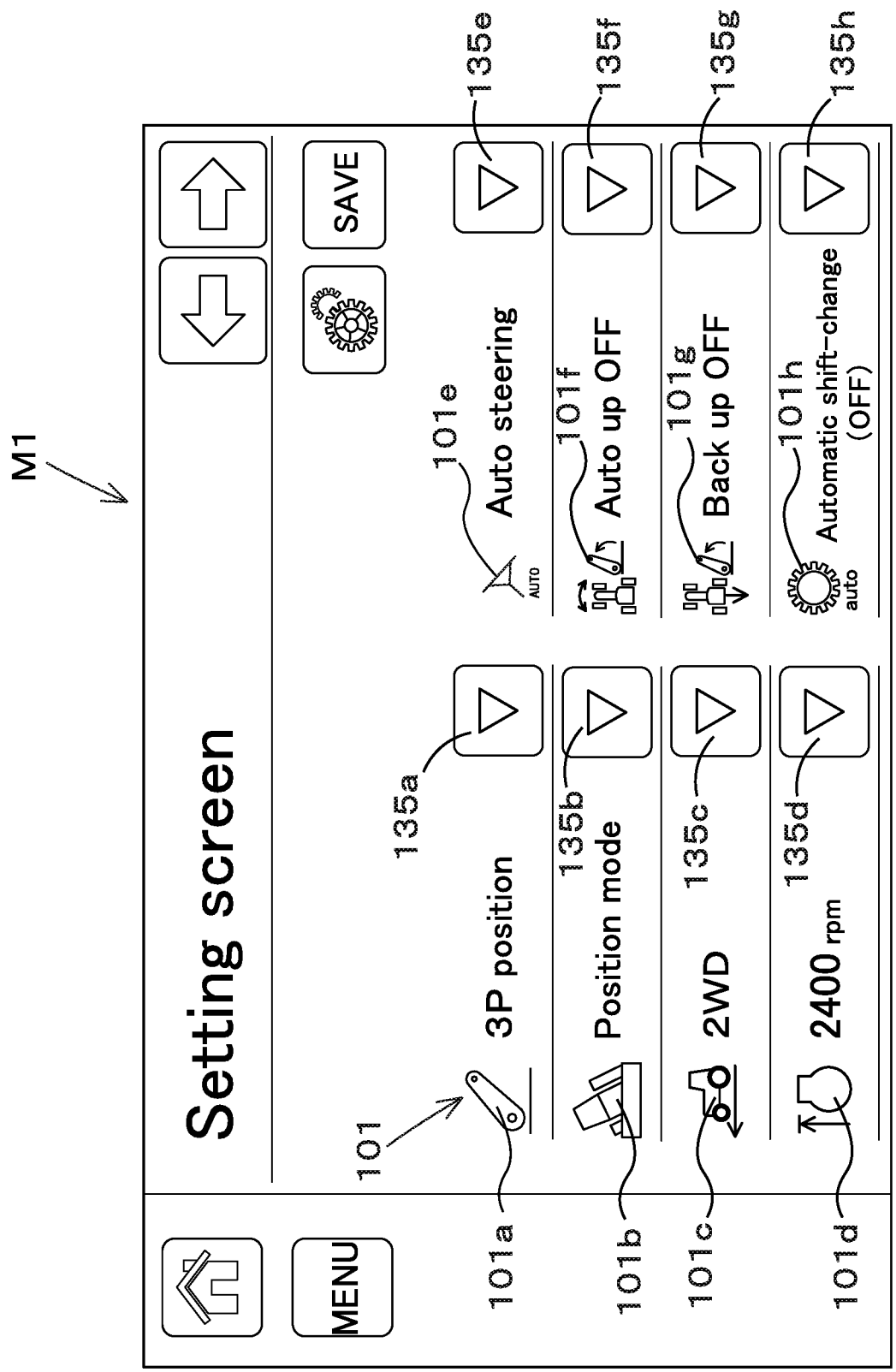
FIG. 3A is a view illustrating an example of a setting screen M1.

In particular, when a predetermined operation is performed on the display device 50B, the display device 50B displays a setting screen M1 as shown in FIG. 3A. The setting screen M1 displays a plurality of icons (symbol marks) 101 assigned to a plurality of operations of the tractor 1. The plurality of icons 101 include an icon 101a to an icon 101h.

The icon 101a is an icon representing the operation in the manual lifting of the elevation device 8, the icon 101b is an icon representing the operation of the posture changing device 25, the icon 101c is an icon representing the operation of the traveling device 7, the icon 101d is an icon representing the operation in the prime mover rotation speed of the prime mover 4, the icon 101e is an icon indicating the operation of the automatic steering operation of the steering device 11, an icon 101f is an icon indicating the operation of the auto-up of the elevation device 8, an icon 101g is an icon representing the operation of the backup of the elevation device 8, and the icon 101h is an icon representing the operation of the automatic shift changing of the transmission 5.

Change buttons (changing operation tools) 135a to 135h are associated with the icon 101a to icon 101h, respectively. Contents (settings) such as the operations corresponding to the icon 101a to icon 101h can be changed (determined) by operating the change buttons 135a to 135h.

The change button 135a is a button for determining whether to validate or invalidate the manual elevating function, the change button 135b is a button for determining which one of the leveling function and the tilting function is validated, the change button 135c is a button for determining any one of the 4WD, the 4WD double speed, and the 2WD, the change button 135d is a button for determining the upper limit of the prime mover rotation speed, the change button 135e is a button for determining whether to validate or invalidate the automatic steering function, the change button 135f is a button for determining whether to validate or invalidate the auto up function, the change button 135g is a button for determining whether to validate or invalidate the backup function, and the change button 135h is a button for determining whether to validate or invalidate the automatic shift changing function. As shown in FIG. 3B, the display device 50B can also display the setting screen M2. In the setting screen M2, a plurality of icons 101i representing the plurality of auxiliary valves 27 are displayed, and a change button (changing operation tool) 135i is associated with the plurality of icons 101i. The change button 135i can set whether to use each of the plurality of auxiliary valves 27 (whether to validate or invalidate) as the operation setting.

As described above, as illustrated in FIG. 4, the operation setting received by the setting receiver portion 58 is stored (saved) in the memory portion 45 as information (the second operation information) relating to the operation of the vehicle body 3.

As shown in FIG. 1C, the shift-changing control portion 40A, the engine control portion 40B, the PTO control portion 40C, the elevation control portion 40D, the automatic steering control portion 40E, the posture control portion 40F, and the auxiliary hydraulic control portion 40G are connected to the in-vehicle network N1 compliant with the international standard ISO11783 (ISOBUS). A communication controller portion 43 that supports the TIM (tractor implement management system) is connected to the in-vehicle network N1. The communication controller portion 43 is constituted of a CPU, electric/electronic components, or the like, and communicates with the control device 2a of the working device 2 under a predetermined communication protocol. That is, the communication controller portion 43 is electrically connected to the working device 2 via the in-vehicle network N1, and can communicate bi-directionally. The control device 2a can output various information related to the working device 2, for example, the first operation information related to the operation of the working device 2 to the in-vehicle network N1.

The communication controller portion 43 can acquire the first operation information. The first operation information is information (request information) from the working device 2 to the tractor 1 (the vehicle body 3), function information (compatibility information) of the working device 2 with respect to the tractor 1, condition information (status information) indicating the state of the working device 2, and the like. For example, the request information includes the vehicle speed, the PTO rotation speed, the hydraulic pressure, and the like. The function information is information indicating whether a plurality of software functions and hardware functions prepared in the tractor 1 (the vehicle body 3) are supported. The status information is information indicating a state of the working device 2 such as an error.

Now, the tractor 1 includes a applicability judging portion 62. The applicability judging portion 62 is constituted of a CPU, electrical/electronic components, or the like. The applicability judging portion 62 judges the degree of applicability based on the first operation information acquired by the communication controller portion 43 to determine whether the operation of the working device 2 is hindered.

The applicability judging portion 62 refers to the first operation information acquired by the communication controller portion 43, and refers to the memory portion 45 to acquire the second operation information. The applicability judging portion 62 compares the first operation information with the second operation information, and determines the applicability degree is high when the first operation information is the same with the second operation information, and judges the applicability degree based on the degree of divergence between the pieces of operation information when the first operation information is not the same with the second operation information.

Figure 5:
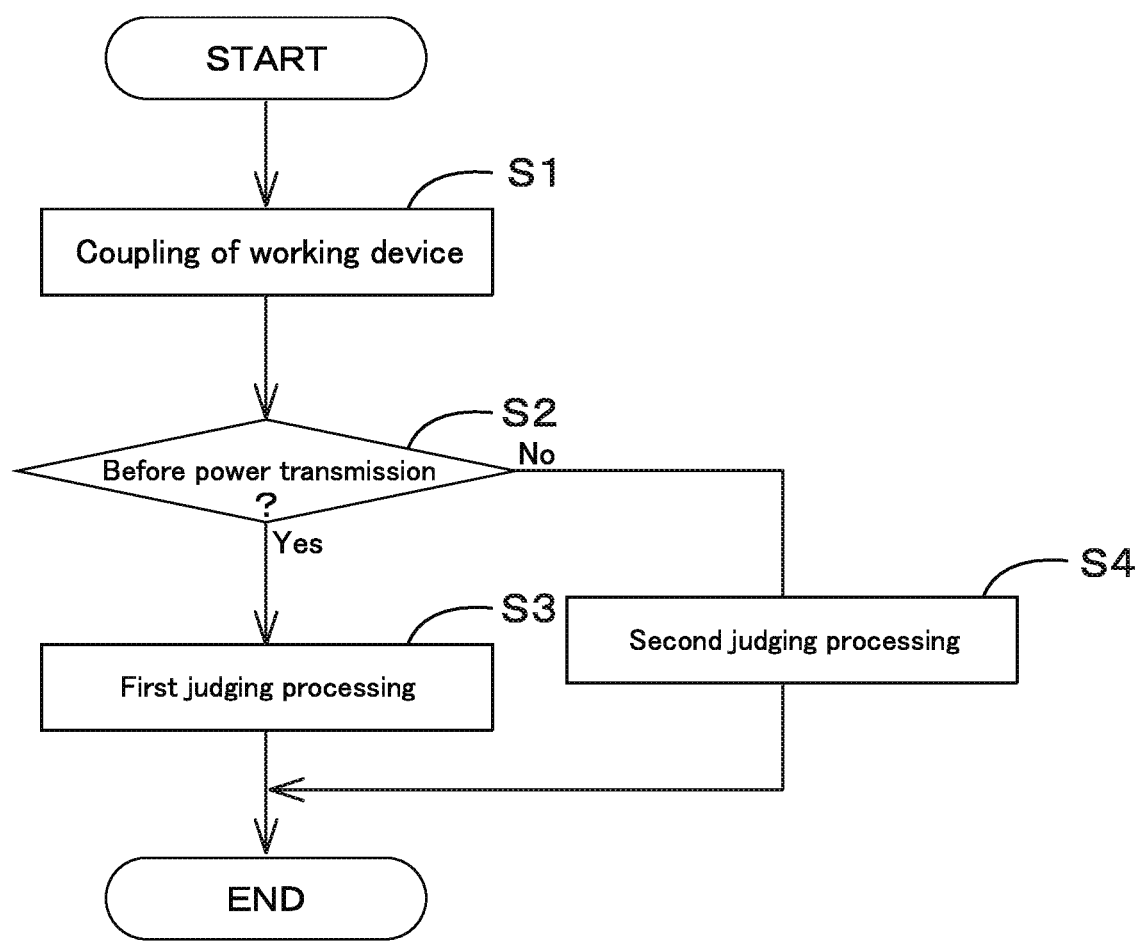
FIG. 5 is a view illustrating a flow of judging applicability between a working vehicle and a working device.

As shown in FIG. 5, after the working device 2 is connected to the tractor 1 by the ISOBUS connector (step S1), before the power of the PTO shaft 16 is transmitted to the working device 2 (step S2, Yes), for example, before the prime mover 4 is started or when the PTO clutch 5e1 is held in the disengaged state, the applicability judging portion 62 executes a first judging processing (step S3). The first judging processing judges the degree of applicability between the installed functions (the software functions, the hardware functions) mounted on the tractor 1 and the function information (the compatibility information) of the working device 2.

In particular, as shown in FIG. 6A, for example, the applicability judging portion 62 compares the function information of the working device 2 acquired via the communication controller portion 43 with the installed functions (the software functions, the hardware functions) of the tractor 1. In FIG. 6A, the function information of the working device 2 includes the automatic shift changing, the 2WD, the manual elevating, the holding, the rear PTO driving, the front PTO driving, and the auxiliary valve. On the other hand, the installed function of the tractor 1 has all of the function information (the automatic shift changing, the 2WD, the manual elevating, the holding, the rear PTO driving, the front PTO driving, and the auxiliary valve) indicated by the working device 2. Thus, the applicability judging portion 62 determines that the tractor 1 and the working device 2 are optimal with a high degree of applicability.

In addition, as shown in FIG. 5, after the power of the PTO shaft 16 is transmitted to the working device 2 (step S2, No), the applicability judging portion 62 performs a second judging processing (step S4).

As shown in FIG. 6B, in the second judging processing, the applicability judging portion 62 refers to the request information requested to the tractor 1 when the working device 2 is operated, and compares the request information with the operation setting of the tractor 1, for example. In FIG. 6B, the automatic transmission function is set to be valid in the tractor 1, whereas the working device 2 requests invalidation of the automatic transmission function. The applicability judging portion 62 determines that the automatic transmission function is slightly applicable because the request of the working device 2 and the setting of the tractor 1 are different from each other. In addition, in FIG. 6B, in the tractor 1, the auxiliary valve 27 whose set pressure (the pilot pressure) is 10 MPa is set among the plurality of auxiliary valves 27 in the tractor 1, whereas the set pressure of the auxiliary valve 27 requested by the working device 2 is 15 MPa. The applicability judging portion 62 determines that the auxiliary valve 27 is slightly applicable because the request of the working device 2 and the setting of the tractor 1 are different from each other.

Figure 6C:
FIG. 6C is a view illustrating an example of the applicability.

As shown in FIG. 6C, the applicability judging portion 62 determines the applicability degree in stepwise. This stepwise degree indicates whether or not it can be used like plug and play of a computer. For example, the applicability judging portion 62 determines that the operation of the working device 2 is not interfered when the installed functions and function settings of the tractor 1 sufficiently satisfy the requirements and compatibility of the working device 2, and thus it is determined that the applicability is "optimal". The term "optimal" indicates an available state (ready). When the operation of the working device 2 can be performed (the working device 2 can continue the working) in the case where some of the installed functions and settings of the tractor 1 do not satisfy the requirements and compatibility of the working device 2, the applicability judging portion 62 determines, as "slightly applicable", a state where at least some of the functions can be used. The applicability judging portion 62 determines, as "inapplicable", a state where the installed function of the tractor 1 and a part of the setting of the functions do not satisfy the requirements and compatibility of the working device 2 and further preparation is necessary. The applicability judging portion 62 determines, as "not ready", a state where the working device 2 cannot be operated by the power of the tractor 1 or a state where the applicability judging portion 62 cannot determine whether or not the working device 2 or the tractor 1 can operate due to an error such as communication failure.

In addition, the applicability judging portion 62 may determine the applicability degree in the plurality of working devices 2. For example, it is possible to determine the degree of applicability between the working device (a front working device) 2 connected to the front portion of the tractor 1 and the working device (a rear working device) 2 connected to the rear portion of the tractor 1. The applicability judging portion 62 determines, as at least "slightly applicable", a state where any one of the front working device 2 and the rear working device 2 can be operated.

Figure 7B:
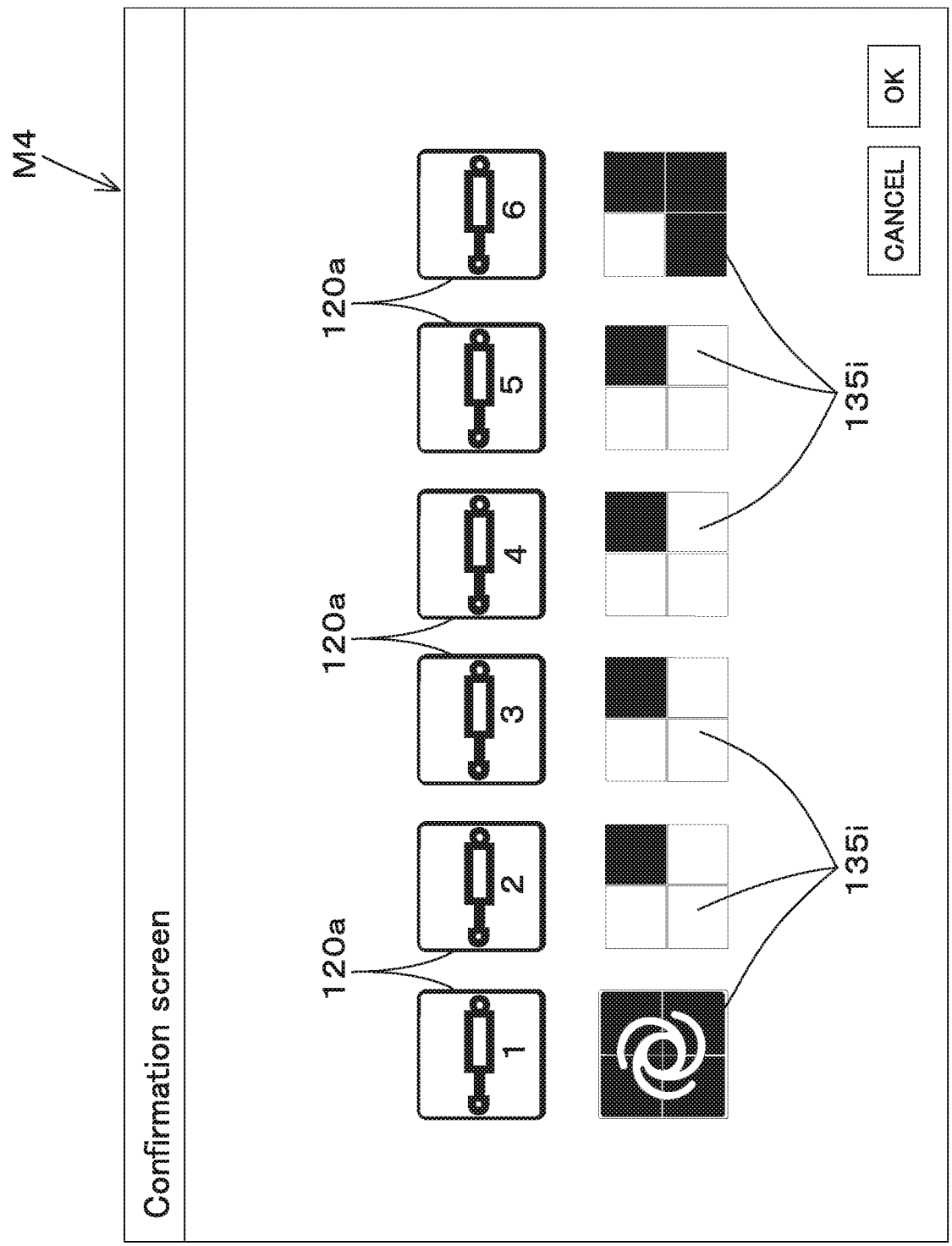
FIG. 7B is a view illustrating an example of a confirmation screen M4 other than that of FIG. 7A.

As illustrated in FIG. 7A, the display device 50B displays the degree of applicability determined by the applicability judging portion 62. When a predetermined operation is performed on the display device 50B, the display device 50B displays a confirmation screen M3.

The confirmation screen M3 includes a first area 161 for displaying the tractor 1 side (the TIM server side), a second area 162 for displaying the working device 2 (the client side) connected to the rear portion side of the tractor 1, and a third area 163 for displaying the working device 2 (the client side) connected to the front portion side of the tractor 1. A graphic D1 imitating the tractor 1 is displayed in the first area 161, a graphic D2 imitating the working device 2 is displayed in the second area 162, and graphic D3 imitating the working device 2 is displayed in the third area 163. For example, when the working device 2 is connected to the tractor 1, the display device 50 refers to the memory portion 45, and searches for graphic data indicating the graphics D2 and D3 of the working device 2. Then, the display device 50 displays the graphics D2 and D3 corresponding to the working device 2 connected to the tractor 1 on the confirmation screen M3.

The confirmation screen M3 includes a first operation display portion 111 representing the operation (the function) of the tractor 1, a second operation display portion 112 representing the operation (the function) of the working device 2 to be provided at the rear portion of the tractor 1, and a third operation display portion 113 representing the operation (the function) of the working device 2 provided at the front portion of the tractor 1. The first operation display portion 111 is displayed in the first area 161, the second operation display portion 112 is displayed in the second area 162, and the third operation display portion 113 is displayed in the third area 163. A plurality of icons (symbol marks) 120 indicating the operations (the functions) are displayed on the first operation display portion 111, the second operation display portion 112, and the third operation display portion 113.

The plurality of icons 120 include an icon 120a to an icon 120g. The icon 120a is an icon indicating the operation of the auxiliary valve 27, the icon 120b is an icon indicating the front PTO driving, the icon 120c is an icon indicating the rear PTO driving, the icon 120d is an icon indicating the front elevation, the icon 120e is an icon indicating the rear elevation, the icon 120f is an icon indicating the operation of the traveling device 7, and the icon 120g is an icon indicating the automatic steering.

The confirmation screen M3 includes a plurality of applicability display portions 121 that display the applicability degree determined by the applicability judging portion 62. The plurality of applicability display portions 121 are displayed in the first area 161, and display an icon indicating the degree of applicability illustrated in FIG. 6C.

The plurality of applicability display portions 121 are associated with a plurality of icons 120. The plurality of applicability display portions 121 include an applicability display portion 121a corresponding to the icon 120a, an applicability display portion 121b corresponding to the icon 120b, an applicability display portion 121c corresponding to the icon 120c, an applicability display portion 121d corresponding to the icon 120d, an applicability display portion 121e corresponding to the icon 120e, an applicability display portion 121f corresponding to the icon 120f, and an applicability display portion 121g corresponding to the icon 120g. The applicability display portions 121a to 121g and the icons 120a to 120f are arranged in the lateral direction.

As shown in FIG. 7A, the display of the applicability display portions 121a to 121g changes according to the degree of applicability. For example, when the working device 2 is operating, the applicability display portions 121a to 121g change the degree of applicability each time the applicability judging portion 62 performs the second judging processing.

When the icon 120a displayed on the confirmation screen M3 is selected, the applicability judging portion 62 compares the set pressures of the plurality of auxiliary valves 27 mounted on the tractor 1 with the set pressures requested by the working device 2. Then, the applicability degree of each of the plurality of auxiliary valves 27 is determined. And then, as shown in the confirmation screen M4 in FIG. 7B, a plurality of icons 120a indicating the plurality of auxiliary valves 27 and a degree of applicability corresponding to each of the plurality of icons 120a are associated with the plurality of icons 120a are displayed by the applicability display portion 121a. In this manner, by changing the connection destination of the hydraulic hose connected to the current output port of the auxiliary valve 27, the degree of applicability in the auxiliary valve 27 can be changed. Or, in the structure where a predetermined auxiliary valve 27 can be selected among the plurality of auxiliary valves 27, the applicability degree in the auxiliary valve 27 can be changed by switching to the auxiliary valve 27 with high applicability degree.

As shown in FIG. 1C, a permission operation tool 135 may be provided on the tractor 1. The permission operation tool 135 is a switch configured to be switched around ON/OFF, the switch being arranged around the operator seat 10, and can be operated by an operator. When the permission operation tool 135 is turned on, the operation of the vehicle body 3 is permitted, and the control device 40 (the shift-changing control portion 40A, the engine control portion 40B, the PTO control portion 40C, the elevation control portion 40D, the automatic steering control portion 40E, the posture control portion 40F, and the auxiliary hydraulic pressure control portion 40G) refers to the memory portion 45, and controls the vehicle body 3 based on the second operation information stored in the memory portion 45. When the permission operation tool 135 is turned off, the operation of the vehicle body 3 is held unpermitted, and the operation of the vehicle body 3 indicated in the second operation information is not performed.

In addition, the control device 40 has a changing portion 44. The changing portion 44 is constituted of a CPU, an electric and electronic circuit, a program stored in the control device 40, and the like. The changing portion 44 changes the control of the vehicle body 3 based on the degree of applicability determined by the applicability judging portion 62. The control device 40 changes the control of the vehicle body 3 when the degree of applicability is low. For example, as illustrated in FIG. 6B, when the working device 2 requests invalidation of the automatic shift-changing function, the control device 40 temporarily invalidate the automatic shift changing only in a period during which the working device 2 requests invalidation of the automatic shift changing function (a request period).

Alternatively, when the working device 2 requests a set pressure of 15 MPa, the control device 40 switches to the auxiliary valve (for example, the auxiliary valve 1 in FIG. 2C) 27 having a set pressure exceeding the set pressure 15 MPa required by the working device 2.

The applicability judging portion 62 determines the applicability degree between the tractor 1 (the vehicle body 3) and the working device 2 by referring to the operation setting set on the setting screen M1 of the display device 50B. However, the degree of applicability may be determined based on the operation setting uniquely included in the control device 40. The operation setting of the control device 40 is a control parameter, a control gain, and the like for executing the control. For example, a steering control parameter to determine a setting value of the steering angle of the steering device 11 with respect to the position deviation between the vehicle body position and the scheduled traveling line in performing the automatic steering, an elevation control gain for outputting an output current to the control valve 34 with respect to the operation amount of the switch 42g in performing the manual elevation, a hydraulic control gain for outputting an operation amount of the hydraulic operation tool 42j and an output current to the auxiliary valve 27, and the like. Control parameters, control gains, and the like are set by a program or the like stored in the control device 40. The applicability judging portion 62 acquires the first operation information (the control parameter, the control gain) requested from the working device 2, and compares the first operation information with the second operation information (the control parameter, the control gain) of the control device 40. The applicability judging portion 62 determines as being applicable (determines as being optimal) when the second operation information (the control parameter, the control gain) satisfies the first operation information (the control parameter, the control gain) requested from the working device 2. On the other hand, when the second operation information (the control parameter, the control gain) is not satisfied with respect to the first operation information (the control parameter, the control gain) requested from the working device 2, the applicability judging portion 62 determines as being applicable, inapplicable, and not ready as the divergence of each value of the control parameter and the control gain increases.

The applicability judging portion 62 determines the degree of applicability between the tractor 1 (the vehicle body 3) and the working device 2 by referring to the operation setting set on the setting screen M1 of the display device 50B. However, the degree of applicability may be determined based on the operation settings set by the setting tools (the shift changeover switch 42d, the height setting dial 42h, and the rotation setting tool 42k) arranged around the operator seat 10. In the second judging processing, the applicability judging portion 62 refers to the setting of the shift changeover switch 42d (valid/invalid of the automatic shift changing), the setting of the height setting dial 42h (the height setting of the elevation device 8), and the setting of the rotation setting tool 42k (the upper limit of prime mover rotation speed). As shown in FIG. 8, it is determined whether the operation setting of the setting tool is applicable to the request of the working device 2. The operation whether or not the applicability judging portion 62 judges the applicability based on the operation setting of the setting tool can be switched by operating the display device 50B or the like, for example.

In addition, as illustrated in FIG. 1C, the control device 40 includes an outputting portion 46. The outputting portion 46 outputs, to the external device 47, the degree of applicability determined by the matching determination unit 62. The outputting portion 46 is, for example, a communication device (a communication module) configured to perform either one of the direct communication and the indirect communication with an external device 47, and can perform the wireless communication under the Wi-Fi (Wireless Fidelity, a registered trademark) of IEEE802.11, the BLE (Bluetooth (a registered trademark) Low Energy), the LPWA (Low Power, Wide Area), the LPWAN (Low-Power Wide-Area Network), and the like. In addition, the outputting portion 46 may be a communication device (a communication module) configured to perform the wireless communication through a mobile phone communication network or a data communication network.

The external device 47 is a portable type terminal (a mobile terminal) such as a tablet, a smartphone, or a PDA, or a stationary type terminal (a stationary terminal) such as a personal computer or server. For example, when the outputting portion 46 receives a request for an applicability result from the external device 47, the outputting portion 46 transmits, to the external device 47, the applicability result determined by the matching determination unit 62.

Second Embodiment

Figure 9:
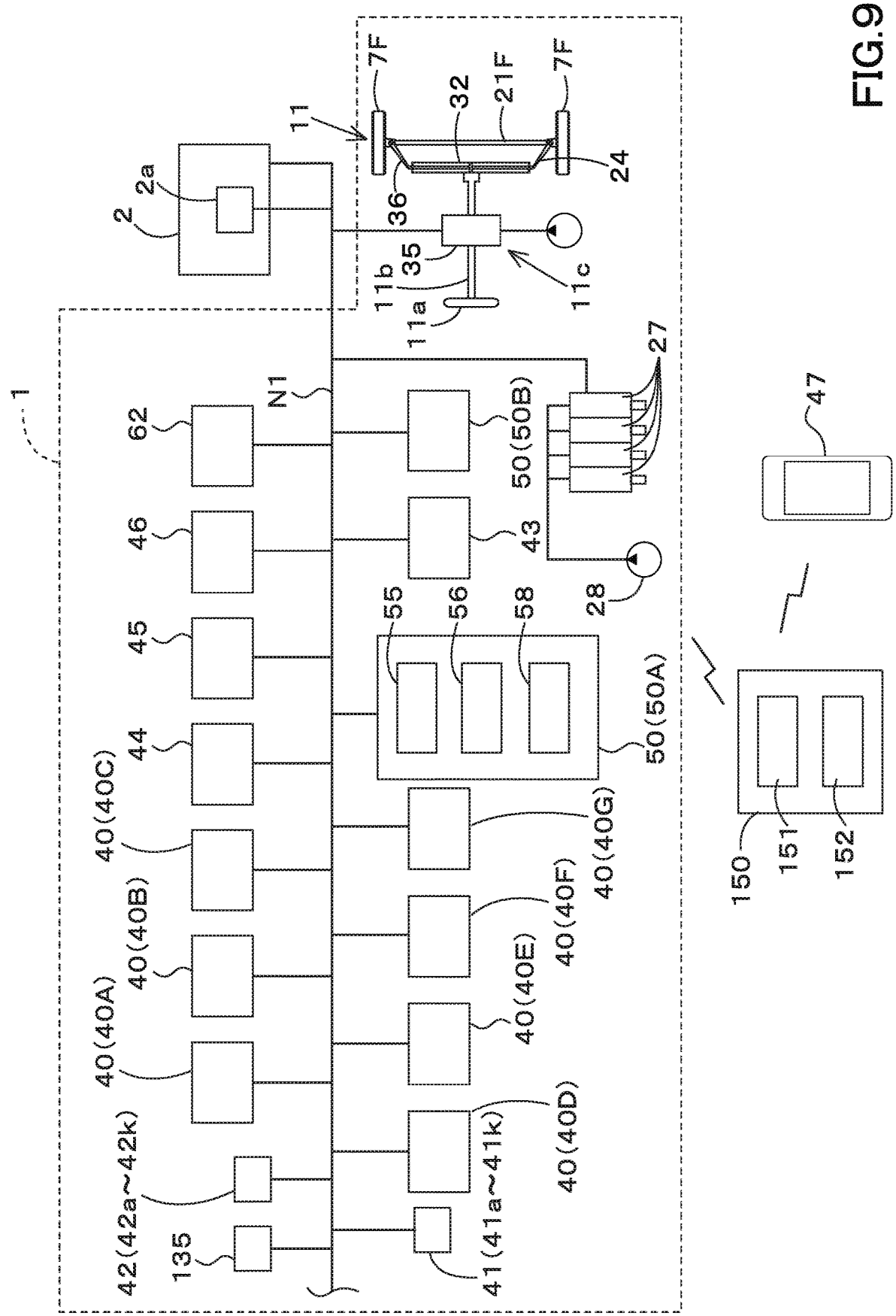
FIG. 9 is a view illustrating an example of a support system for the working vehicle.

FIG. 9 shows a working vehicle support system. The working vehicle support system includes the external device 47 and a server 150. The server 150 acquires the vehicle information of the tractor 1 and the degree of applicability (the applicability result). The vehicle information is information for identifying the tractor 1, for example, the model of the tractor 1, the model number, the serial number, the version of the software program stored in the control device 40, and the like. The applicability result is information indicating the operation (the function) used for determining the applicability and the degree of applicability.

The server 150 receives the vehicle information and the applicability result by the communication device 151 through the indirect communication via the external device 47 and the direct communication of the outputting portion 46, and stores the vehicle information and the applicability result in the database 152 or the like. As shown in FIG. 10, the tractor 1 in which the software program (the program) A is stored in the control device 40 can know that the auto-up function and the backup function do not correspond to the function of the working device 2, and there is no compatibility between the tractor 1 and the working machine 2. The communication device 151 of the server 150 transmits the program for improving the degree of applicability to the outputting portion (the communication device) 46 of the tractor 1. That is, the server 150 judges whether or not the tractor 1 and the working device 2 are applicable each other based on the applicability result, searches for a program suitable for the working device 2, and transmits a program B suitable for the working device 2 through the outputting portion (the communication device) 46.

In the case where the program B is transmitted from the server 150 to the outputting portion (the communication device) 46 of the tractor 1, the tractor 1 is set to a mode for receiving the program (a maintenance mode). When the tractor 1 receives the program B, the tractor 1 rewrites the program stored in the control device 40.

In the case where the working vehicle support system is employed as in the present embodiment, the status of the working vehicle can be known and appropriate advice can be given to the user without a service person going to the site. In addition, depending on the status of the working vehicle, the software update can be performed through the server 150.

The working vehicle 1 includes the vehicle body 3 to which the working device 2 can be connected, the communication control portion 43 that is electrically connected to the working device 2, capable of bidirectional communication, and capable of acquiring the first operation information relating to the operation of the working device 2, the applicability judging portion 62 that judges the applicability degree whether the operation of the working device 2 is hindered based on the first operation information acquired by the communication controller portion 43, and the display device 50 that displays the applicability degree determined by the applicability judging portion 62. According to that configuration, when the working device 2 is connected to the working vehicle 1, it is possible to grasp the applicability degree indicating whether or not there is a problem in the operation of the working device 2. That is, the applicability between the working vehicle and the working device can be easily grasped simply by connecting the working device to the working vehicle.

The display device 50 receives the second operation information relating to the operation of the vehicle body 3, and the applicability judging portion 62 determines the applicability degree based on the first operation information and the second operation information received by the display device 50. According to that configuration, it is possible to grasp the applicability degree as to whether there is any hindrance in the operation of the working device 2 based on the second operation information in which the operation of the vehicle body 3 is received by the display device 50.

The working vehicle 1 includes the control device 40 that controls the vehicle body 3 in accordance with second operation information related to the operation of the vehicle body 3, and the applicability judging portion 62 determines the applicability degree on the basis of the first operation information and the second operation information of the control device 40. According to that configuration, it is possible to grasp the applicability degree as to whether there is any hindrance in the operation of the working device 2 based on the second operation information used when the control device 40 controls the vehicle body 3.

The applicability judging portion 62 performs the first judging processing of the applicability degree based on the second operation information before the power transmission from the vehicle body 3 to the working device 2 and performs the second judging processing of the applicability degree based on the second operation information after the power transmission from the vehicle body 3 to the working device 2. According to that configuration, not only the applicability between the working vehicle and the working device can be easily grasped before the working device 2 is operated by the power from the vehicle body 3, but also the applicability between the working vehicle and the working device can be easily grasped also when the working device 2 is operated by the power from the vehicle body 3. That is, the working can be performed while grasping the applicability before and after the operation of the working device 2.

The working vehicle 1 includes a memory portion 45 that stores the second operation information, and the applicability judging portion 62 refers to the second operation information stored in the memory portion 45 when judging the applicability degree. According to that configuration, the applicability can be judged after referring to the second operation information stored in the memory portion 45 in the working vehicle 1.

The working vehicle 1 includes the permission operation tool 135 for operation to switch the operation of the vehicle body 3 between permitted and not-permitted, and the control device 40 to control the vehicle body 3 on the basis of the second operation information when the operation of the vehicle body 3 is permitted by the permission operation tool 135. According to that configuration, after confirming the applicability on the display device 50, the operator (the driver) can operate the vehicle body 3 or can stop operating the vehicle body 3. That is, it is possible to operate the vehicle body 3 or stop operating the vehicle body 3 according to the applicability.

The working vehicle 1 includes the outputting part 46 to output, to the external device 47, the applicability degree judged by the applicability judging portion 62. According to that configuration, the external device 47 can acquire the applicability degree, and the external device 47 can grasp the applicability.

The control device 40 includes the changing portion 44 to change the controlling of the vehicle body 3 on the basis of the applicability judged by the applicability judging device 62. According to that configuration, the changing portion 44 can perform the control for improving the degree of applicability.

The support system for the working vehicle 1 includes the server 150 to obtain, from the working vehicle 1, the applicability and vehicle information relating to the working vehicle, and the external device 47 to obtain the applicability and the vehicle information from the server 150 and to display the applicability and the vehicle information obtained above. According to that configuration, the relation between the vehicle information of the working vehicle 1 and the degree of applicability can be confirmed by the external device 47. For example, it is possible to grasp the conditions of the relation between the applicability degree and the type and model of the working vehicle 1.

Either one of the server 150 and the external device 47 includes the communication device 151 to transmit, to the working vehicle 1, a software program for improving the applicability. According to that configuration, the applicability degree of the working vehicle 1 can be easily improved.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working vehicle comprising:
a vehicle body configured to be detachably coupled to a working device;
a controller configured to control the vehicle body, and to communicate bi-directionally with the working device via an in-vehicle network compliant with an international standard ISO 11783 (ISOBUS);
a communicator connected to the in-vehicle network to obtain first operation information relating to first operation and/or function of the working device;
a memory to store second operation information relating to second operation and/or function of the vehicle body;
an applicability determiner configured to determine applicability of the first operation and/or function of the working device to the second operation information of the vehicle body by comparing the first operation information with the second operation information;
wherein the applicability determiner is configured to determine a plurality of stepwise applicability degrees as the applicability of the first operation and/or function of the working device to the second operation and/or function of the vehicle body; and
a display configured to display the applicability determined by the applicability determiner;
wherein the display is further configured to display:
a plurality of first icons each indicating the first operation and/or function of the working device, and
a plurality of second icons each indicating the stepwise applicability degrees of the first operation and/or function of the working device to the second operation and/or function of the vehicle body, in an associated manner.

2. The working vehicle according to claim 1,
wherein the display receives the second operation information relating to an operation of the vehicle body.

3. The working vehicle according to claim 1, wherein the controller is configured to control the vehicle body in accordance with second operation information relating to operation of the vehicle body.

4. The working vehicle according to claim 1,
wherein the applicability determiner is configured to perform :
a first determining processing to determine the applicability based on the second operation information before power transmission from the vehicle body to the working device; and
a second determining processing to determine the applicability based on the second operation information after the power transmission from the vehicle body to the working device.

5. The working vehicle according to claim 1, comprising:
a switch for an operator to switch whether or not the second operation and/or function of the vehicle body is permitted; and
wherein the controller is configured to control the vehicle body based on the second operation information when the second operation and/or function of the vehicle body is permitted by the switch.

6. The working vehicle according to claim 1, comprising
a transmitter to transmit, to an external terminal, the applicability determined by the applicability determiner.

7. The working vehicle according to claim 1,
wherein the controller is configured to change the second operation and/or function of the vehicle body to improve the applicability determined by the applicability determiner.

8. A support system for a working vehicle, comprising:
a server to obtain, from the working vehicle according to claim 1, the applicability and vehicle information relating to the working vehicle; and
an external terminal to obtain the applicability and the vehicle information from the server and to display the applicability and the vehicle information obtained above.

9. The support system according to claim 8,
wherein the server or the external terminal device includes
a terminal communicator to transmit, to the working vehicle, a software program for improving the applicability.

10. The working vehicle according to claim 1, wherein the applicability determiner is configured to determine the applicability as being optimal when the first operation and/or function of the working device is applicable to the second operation and/or function of the vehicle body.

11. The working vehicle according to claim 1, wherein
the display is configured to display a plurality of change buttons allowing an operator to change a setting of the second operation and/or function of the vehicle body for changing the second operation information, in an associated manner with respective one of the first icons, and
the applicability determiner is configured to determine the applicability, in accordance with the changed second operation information of the vehicle body.

12. A working vehicle comprising:
a vehicle body configured to be detachably coupled to a working device;
a communicator connected to an in-vehicle network compliant with an international standard ISO 11783 (ISO-BUS), the communicator configured to obtain first operation information relating to first operation and/or function of the working device;
a memory connected to the in-vehicle network, to store second operation information relating to second operation and/or function of the vehicle body;
a controller connected to the in-vehicle network, and configured or programmed to control the vehicle body, and
determine applicability of the first operation and/or function of the working device to the second operation information of the vehicle body by comparing the first operation information with the second operation information;
wherein the controller is configured to determine a plurality of stepwise applicability. degrees as the applicability of the first operation and/or function of the working device to the second operation and/or function of the vehicle body; and
a display configured to display the applicability determined by the controller;
wherein the display is further configured to display:
a plurality of first icons each indicating the first operation and/or function of the working device, and
a plurality of second icons each indicating the stepwise applicability degrees of the first operation and/or function of the working device to the second operation and/or function of the vehicle body, in an associated manner.

* * * * *